United States Patent [19] [11] Patent Number: 5,065,391
Funaki [45] Date of Patent: Nov. 12, 1991

[54] CARTRIDGE CASE FOR A DISK

[75] Inventor: Yoshinori Funaki, Himeji, Japan

[73] Assignee: Daicel Chemical Industries, Ltd., Osaka, Japan

[21] Appl. No.: 514,843

[22] Filed: Apr. 26, 1990

[30] Foreign Application Priority Data

Feb. 13, 1989 [JP] Japan .................... 1-15573[U]

[51] Int. Cl.$^5$ .................... G11B 3/70; G11B 5/02; G11B 23/03
[52] U.S. Cl. .................... 369/291; 369/292; 360/133
[58] Field of Search .................... 369/291, 292, 75.2, 369/77.1; 360/133, 97.01; 206/444

[56] References Cited

U.S. PATENT DOCUMENTS 4,631,716 12/1986 Ikedo et al. .................... 369/75.2
4,680,662 7/1987 Fukushima et al. ............ 369/291 X
4,688,206 8/1987 Nakagawa et al. ................ 369/291
4,740,948 4/1988 Nakamori et al. ................ 369/291
4,799,121 1/1989 Takahashi ..................... 369/291 X

FOREIGN PATENT DOCUMENTS 0013469 1/1986 Japan ................................. 369/77.1
0218231 4/1987 Japan ............................... 360/133 A Primary Examiner—David Trafton
Assistant Examiner—Tien Ba Pham
Attorney, Agent, or Firm—Spencer & Frank

[57] ABSTRACT

A cartridge case for a disk in which an optical disk is adapted to be rotatably housed in the case provided in both lateral sides thereof with openings and at an end thereof with a guide groove, and in which a slider having a shutter for opening and closing the openings of the case with the use of opening pins, is slidably disposed in the guide groove. The guide groove has a V-shape section in order to enhance the strength of the guide walls. To smoothly reciprocate the shutter, either the shutter or the slider is provided at an end thereof with a wide inclined surface which is fit for the guide groove and inclined toward the inside thereof.

7 Claims, 3 Drawing Sheets

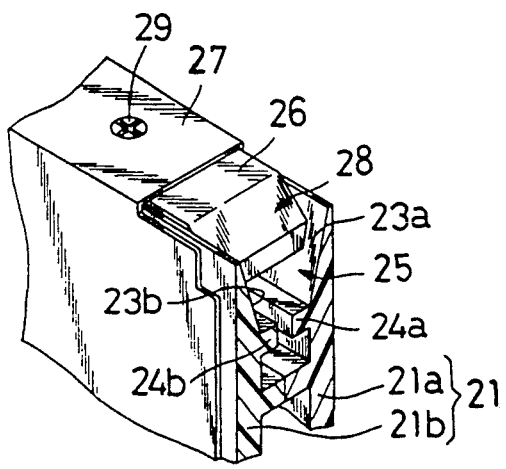
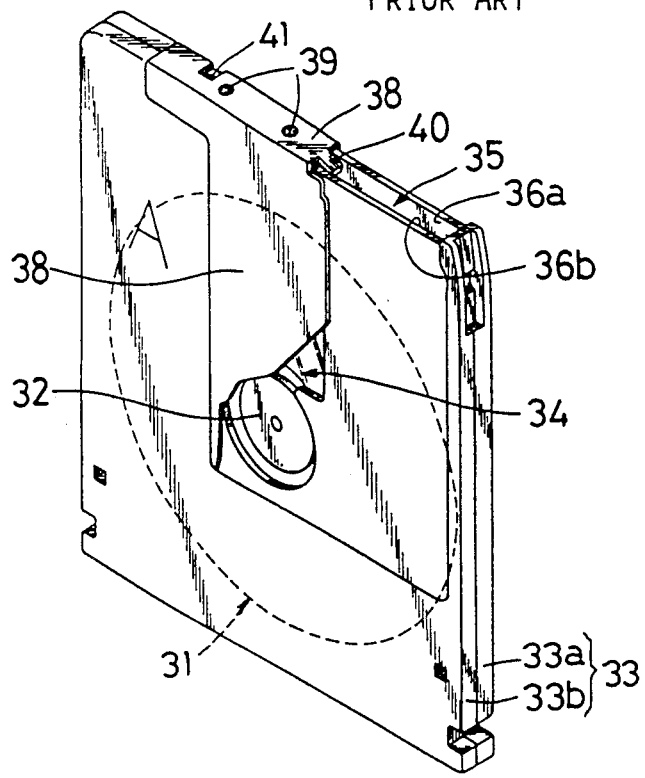
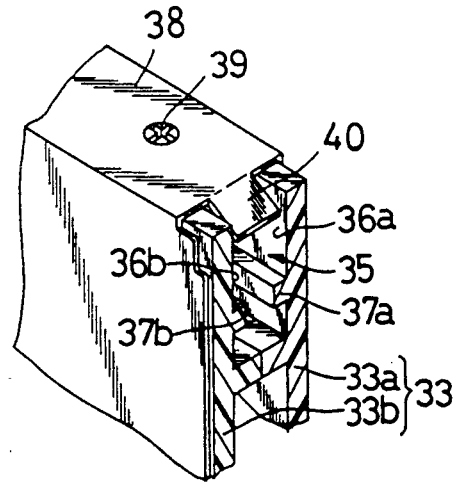

CARTRIDGE CASE FOR A DISK

FIELD OF THE INVENTION

The present invention relates to a cartridge case for housing a disk such as an optical disk or a magneto-optical disk.

BACKGROUND OF THE INVENTION

Optical disks are known as reliable optical recording media capable of recording information in high density. Such optical disks are available in a single-sided type, that is, information may be recorded on one side of the disk and the information thus recorded may be reproduced, and in a double-sided type, that is information may be recorded on both sides of the disk and the information thus recorded may be reproduced. The latter optical disk is usually used, as rotatably housed in a cartridge case, for recording information and reproducing the information thus recorded.

Referring to FIGS. 6 and 7, an optical disk 31 of the double-sided type is provided at the center thereof with a clamping hub 32 for rotating the optical disk 31 through a rotary system of a drive mechanism (not shown). The optical disk 31 is rotatably housed in a case 33 provided in both lateral sides thereof with openings 34. The case 33 includes a first case member 33a and a second case member 33b. As shown in FIG. 7, a guide groove 35 is formed by guide walls 36a, 36b at the lateral sides of the case 33 and projections 37a, 37b respectively formed on the inner surfaces of the guide walls 36a, 36b. The guide groove 35 is formed at one end of the case 33.

A slider (not shown) is slidably disposed in the guide groove 35. A shutter 38 for covering the openings 34 of the case 33 is attached to the slider by attaching means such as screws 39 or the like. The slider is normally pushed in one direction by a spring (not shown) disposed in the case 33.

Formed in the slider and the shutter 38 at predetermined positions thereof are slots 41 with which two shutter opening pins (not shown) of the drive mechanism are adapted to be engaged. The shutter engaged with one of the opening pins is used for opening and closing the openings 34 of the case 33 in order that both sides of the optical disk 31 may be used for recording information and reproducing the information thus recorded. More specifically, when one side of the optical disk 31 is to be used, one opening pin is reciprocated to open and close the openings 34 by the shutter 38, and when the other side of the optical disk 31 is to be used, the case 33 is first reversed and the other opening pin reciprocates the shutter 38 to open and close the the openings 34 of the case 33.

The shutter 38 is provided at one end thereof with a turned piece 40 which is turned toward the inside of the guide groove 35. This turned piece 40 is formed such that, when one opening pin reciprocates the shutter 38 for opening and closing the openings 34 of the case 33, the other opening pin which is not being used for reciprocating the shutter 38, is smoothly guided along the inclined surface of the turned piece 40, thereby to prevent the other opening pin from being caught by the shutter 38.

The efficiency of properly moving away the opening pin which is not being used for reciprocating the shutter 38, depends on the width of the inclined surface of the turned piece 40. Accordingly, to smoothly move away the opening pin in the cartridge case above-mentioned, it is preferable to reduce the thicknesses of the guide walls 36a, 36b to increase the width of the turned piece 40. However, the reduction of the guide walls 36a, 36b in thickness results in reduced strength thereof. It is therefore difficult to reduce the thicknesses of the guide walls 36a, 36b to increase the width of the turned piece 40. Thus, it is inevitable to reduce the width of the turned piece 40. On the other hand, when the width of the inclined surface of the turned piece 40 is small, the opening pin which is not being used may be caught by the shutter 38 when the drive mechanism is driven. This may prevent the shutter 38 from being opened and closed.

SUMMARY OF THE INVENTION

It is an object of the present invention to provide a cartridge case for a disk capable of smoothly opening and closing a shutter.

It is another object of the present invention to provide a cartridge case for a disk capable of smoothly guiding and moving away the opening pin which is not being used, yet assuring the strength of guide walls.

It is a further object of the present invention to provide a cartridge case for rotatably housing an optical disk, in particular, a both-side type optical disk of which both sides may be used for recording information and reproducing the information thus recorded.

To achieve the objects above-mentioned, the cartridge case for a disk in accordance with the present invention comprises: a case for rotatably housing a disk; openings formed in both lateral sides of the case; and a guide groove formed in one end of the case.

The case is adapted to rotatably house preferably an optical disk and more preferably an optical disk of the double-sided type. The guide groove has a V-shape section to enhance the strength of the guide walls. A slider is slidably disposed in the guide groove. To smoothly slide the slider, the slider is preferably made of a material having a small friction coefficient and, more preferably, polyacetal or fluororesin. A shutter for opening and closing the openings of the case is attached to the slider.

Either the shutter or the slider is provided at an end thereof with an inclined surface which is fit to the V-shaped guide groove and inclined toward the inside thereof. Since the guide groove has a V-shape section, the inclined surface at the end of either the shutter or the slider which is fit for the guide groove, has a wider width. Accordingly, the opening pin which is not being used for reciprocating the shutter, may be smoothly moved away along the inclined surface having a larger area.

These and other objects and advantages of the present invention will be better understood by the following detailed description with reference to the attached drawings.

BRIEF DESCRIPTION OF THE DRAWINGS

FIG. 5 is a perspective view in section of main portions of a cartridge case for a disk in accordance with another embodiment of the present invention;

FIG. 6 is a schematic perspective view, with portions broken away, of a conventional cartridge case for an optical disk; and FIG. 7 is a perspective view in section of main portions of the conventional cartridge case in FIG. 6.

DETAILED DESCRIPTION OF THE PREFERRED EMBODIMENTS

Figure 1:
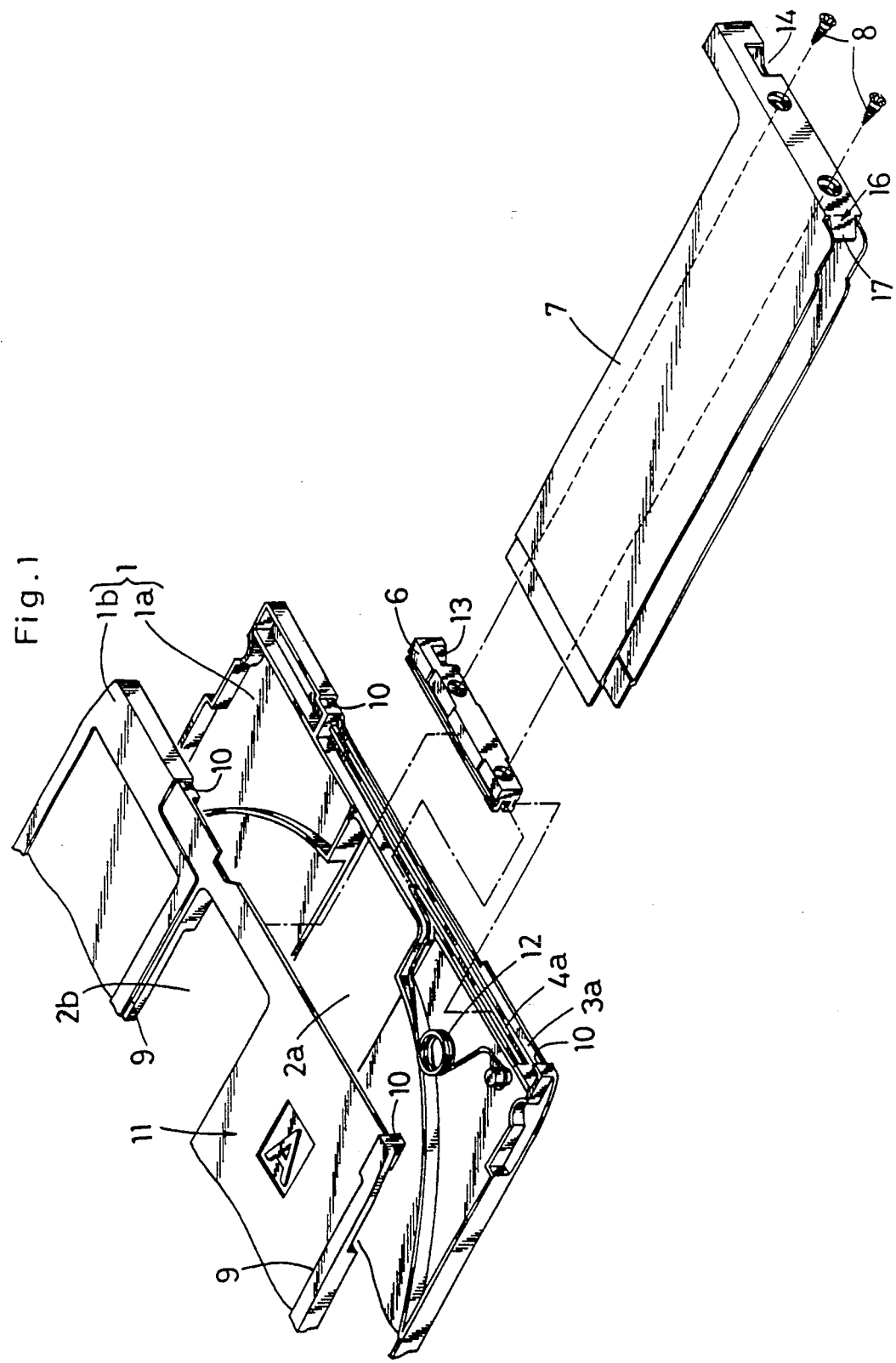
FIG. 1 is an exploded perspective view of main portions of a cartridge case for a disk in accordance with an embodiment of the present invention.

With reference to FIGS. 1 to 4, an optical disk of the double-sided type (not shown) of which both sides are used for recording information and reproducing the recorded information, is provided at the center thereof with a clamping hub (not shown) for rotating the optical disk as an optical recording medium through the rotary system of a drive mechanism, as conventionally done. The optical disk of the double-sided type has a transparent disk substrate, and a recording layer, a reflecting layer, a protective layer and the like formed on the disk substrate.

Such an optical disk is rotatably housed in a case 1. The case 1 includes a first case member 1a and a second case member 1b having the same shape and sizes as those of the first case member 1a. The first and second case members 1a, 1b have openings 2a, 2b which are formed in the lateral sides thereof and which extend from the portions of these lateral sides opposite to the center of the optical disk toward the end peripheries of the first and second case members 1a, 1b. These openings 2a, 2b are used for recording information on and reproducing the recorded information from both sides of the optical disk with the use of a laser beam.

Figure 2:
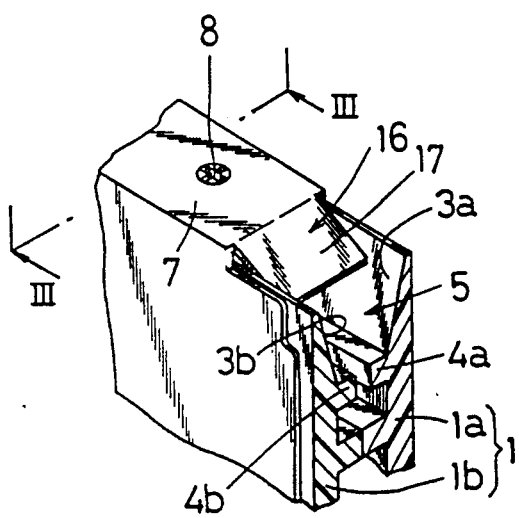
FIG. 2 is a perspective view in section of main portions of the cartridge case for a disk in FIG. 1.
Figure 3:
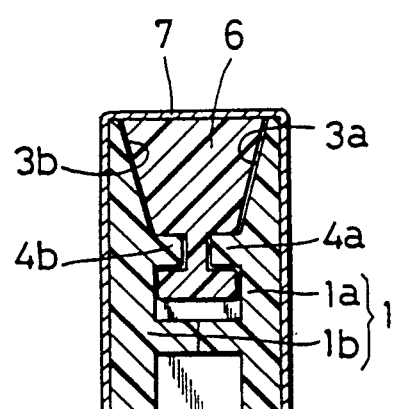
FIG. 3 is a section view taken along the line III—III in FIG. 2.

As shown in FIGS. 2 and 3, the case members 1a and 1b are respectively provided at the ends thereof at the sides of the openings 2a, 2b with guide walls 3a, 3b and projections 4a, 4b. The guide walls 3a, 3b are thicker in the direction toward the insides thereof, and the projections 4a, 4b are respectively formed on the inner surfaces of the guide walls 3a, 3b. The case 1 is formed by bonding the first and second case members 1a, 1b with integrally connecting means such as screws, or adhesives. A V-shape guide groove 5 is formed by the guide walls 3a, 3b and the projections 4a, 4b.

A slider 6 is slidably disposed in the V-shape guide groove 5. A shutter 7 for covering, across the guide groove 5, the openings 2a, 2b in the lateral sides of the case 1, is attached to the slider 6 with attaching means such as screws 8. Regulating portions 9, 10 for regulating a slide area 11 of the shutter 7 are formed at both lateral sides of the case 1 and at both ends of the guide groove 5.

Figure 4:
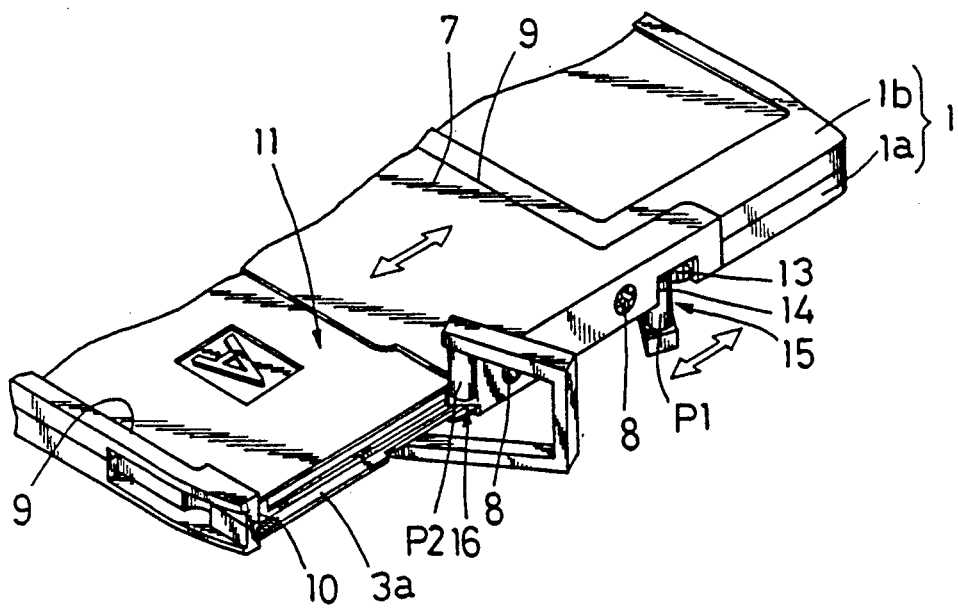
FIG. 4 is a schematic perspective view of a shutter opening and closing mechanism.

As shown in FIGS. 1 and 4, the slider 6 is pushed to a predetermined direction by resilient means such as a spring 12 disposed in the case 1.

The slider 6 has a concave portion 13. A notch 14 is formed in the shutter 7 at its portion opposite to the concave portion 13. A slot 15 is formed by the concave portion 13 and the notch 14.

With the cartridge case having the arrangement above-mentioned, information recording and reproduction may be carried out in the following manner.

As shown in FIG. 4, two shutter opening pins P1, P2 of a drive mechanism (not shown) are adapted to be removably engaged with the slot 15. In the embodiment shown in FIG. 1, when one opening pin P1 engaged with the slot 15 is reciprocated, the shutter 7 is reciprocated, causing the opening 2a and 2b of the case 1 to be opened and closed. This enables one side of the optical disk, i.e., the side B thereof, to be used for recording information or reproducing the recorded information. On the other hand, when the case 1 is reversed and the other opening pin P2 is reciprocated in the same manner as above-mentioned, the opening 2b and 2a of the case 1 is opened and closed. This enables the other side of the optical disk, i.e., the side A in this embodiment, to be used for recording information or reproducing the recorded information.

Recording information on the optical disk is generally carried out by irradiating a laser beam to the disk in the direction from the substrate to the recording layer or another layers so that information is recorded in the form of pit rows, phase variations and the like, in the circumferential direction. Reproduction of the recorded information is generally carried out based on variations of the reflection amount or penetration amount of a laser beam irradiated to the disk in the direction from the substrate to the recording layer or another layers.

The shutter 7 is provided at an end thereof with a turned or bent piece 17 having an inclined surface 16 which is fit to the guide groove 5 and which is inwardly inclined. Since the guide groove 5 is formed in a V-shape, the width of the inclined surface 16 of the turned piece 17 increases in the direction toward the opening of the guide groove 5. With the width of the inclined surface 16 of the turned piece 17 thus increased, it is possible to smoothly guide and move away, along the wide inclined surface 16, the opening pin P2 which is not being used for reciprocating the shutter 7 in the embodiment shown in FIG. 4. Accordingly, the opening pin P2 which is not being used for reciprocating the shutter 7 to open or close the openings 2a, 2b of the case 1, does not prevent the shutter 7 from being smoothly opened and closed. Further, since the guide groove 5 has a V-shape section and the guide walls 3a, 3b are thickened at the inward sides thereof, the strength of the guide walls 3a, 3b may be enhanced.

In another embodiment of the present invention shown in FIG. 5, an inwardly turned inclined surface 28 is formed at the end of a slider 26, instead of the end of a shutter 27. Likewise as in the embodiment shown in FIG. 1, the slider 26 is slidably disposed in a V-shape guide groove 25 formed by guide walls 23a, 23b and projections 24a, 24b of a case 21. The slider 26 is integrally attached to the shutter 27 by screws 29. The case 21 is formed by case members 21a, 21b.

Likewise as in the embodiment shown in FIG. 1, the strength of the guide walls 23a, 23b of the case 21 may also be enhanced. Further, the opening pin which is not being used for reciprocating the shutter 27, may be smoothly guided and moved away by the wide inclined surface 28 of the slider 26.

The angles of the guide walls forming the guide groove of the case may be suitably determined in such a range as to widen the inclined surface at the end of the shutter or the slider and to enhance the strength of the guide walls. The guide walls may be thickened in the direction toward the inner part of the case, not only linearly but also in a curved manner. The inclination angles of the guide walls may be generally set at 30° to 85°, preferably at about 45° to about 80°, with respect to the horizontal direction. The angle of the inclined surface at the end of either the shutter or the slider is set to such an angle as to smoothly guide and move away the opening pin which is not being used for reciprocating the shutter, for example to 25° max.

To smoothly reciprocate the shutter, the slider is preferably made of a material having a small friction coefficient. As such a material, polyolefin may be used, and polyacetal and fluororesin are preferred.

The present invention may be applied to a variety of disks for recording information in and reproducing the recorded information from one side or both sides of the disk, and preferably applied to an optical disk of double-side type.

The present invention may also be applied to optical disks of the read-only type, the additionally writable type and the rewritable type.

What is claimed is:

1. A cartridge case for a disk comprising:
   a case for rotatably housing a disk;
   openings formed in both lateral sides of said case;
   a guide groove formed in an end of said case, said guide groove having a V-shaped inwardly tapering cross-section;
   a slider slidably disposed in said guide groove, said slider having a corresponding V-shaped cross-section to fit said guide groove;
   a shutter attached to said slider and adapted to open and close said openings; and
   either said slider or said shutter being provided at an end thereof with an inclined surface which is fit to said guide groove, said surface being inclined toward the inside of said guide groove.

2. A cartridge case for a disk according to claim 1, wherein the shutter is provided at an end thereof with a turned piece forming said inclined surface and being a wide inclined surface fit to said guide groove.

3. A cartridge case for a disk according to claim 1, wherein the slider is provided at an end thereof with said inclined surface, said surface being a wide inclined surface fit to said guide groove.

4. A cartridge case for a disk according to claim 1, wherein the slider is made of a material having a small friction coefficient.

5. A cartridge case for a disk according to claim 4, wherein the slider is made of polyacetal or fluororesin.

6. A cartridge case for a disk according to claim 1, wherein the disk is an optical disk of the type that both sides thereof are used for recording information and reproducing the recorded information.

7. In a cartridge case for rotatably housing a disk, said case having disk access openings formed in lateral sides thereof and a guide groove formed in an edge thereof, a slider slidably disposed in said guide groove, a shutter for covering and uncovering the disk access openings attached to said slider, and an inclined surface, disposed at an end of either said slider or said shutter and at least partially in said groove, to provide a surface for smoothly guiding and moving away an opening pin not being used to open and close the shutter when the cartridge case is engaged in a drive mechanism, the improvement wherein:
   said guide groove and said slider are formed to have corresponding V-shaped inwardly tapering cross-sections; and
   the width of said inclined surface is fit to the shape of said guide groove.

* * * * *